(12) United States Patent
Jean

(10) Patent No.: US 7,159,442 B1
(45) Date of Patent: Jan. 9, 2007

(54) MEMS MULTI-DIRECTIONAL SHOCK SENSOR

(75) Inventor: Daniel J. Jean, Odenton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/040,300

(22) Filed: Jan. 6, 2005

(51) Int. Cl.
*G01M 7/00* (2006.01)

(52) U.S. Cl. ............... 73/12.01; 73/514.01; 73/514.02; 73/514.15; 73/514.16; 73/514.29; 73/514.35; 73/514.36; 73/514.38; 340/665

(58) Field of Classification Search ............... 73/12.01, 73/488, 514.01, 514.02, 514.15, 514.16, 73/514.29, 514.35, 514.36, 514.38
See application file for complete search history.

(56) References Cited

U.S. PATENT DOCUMENTS

| | | | |
|---|---|---|---|
| 5,441,300 A | * | 8/1995 | Yokota et al. ............... 280/735 |
| 5,506,568 A | | 4/1996 | Chen |
| 5,585,566 A | | 12/1996 | Welles et al. |
| 5,811,910 A | | 9/1998 | Cameron et al. |
| 6,040,625 A | * | 3/2000 | Ip .............................. 257/719 |
| 6,104,307 A | | 8/2000 | Hanratty |
| 6,619,123 B1 | | 9/2003 | Gianchandani et al. |
| 6,737,979 B1 | | 5/2004 | Smith et al. |
| 6,765,160 B1 | | 7/2004 | Robinson |

* cited by examiner

*Primary Examiner*—Edward Lefkowitz
*Assistant Examiner*—Freddie Kirkland, III
(74) *Attorney, Agent, or Firm*—Fredric J. Zimmerman

(57) ABSTRACT

A multi-directional shock sensor having a central post surrounded by an omnidirectionally moveable toroidal mass. A plurality of anchor members surrounds the mass and carries one arm of a latching arm assembly. The other arm of each latching arm assembly is carried by, and radially extends from the mass to oppose a respective first arm. A shock event will cause the mass to move in a certain direction to an extent where one or more of the arm assemblies will latch. The latching may be determined by an electrical circuit connected to contact pads on the central post and on the anchor members.

19 Claims, 6 Drawing Sheets

MEMS MULTI-DIRECTIONAL SHOCK SENSOR

STATEMENT OF GOVERNMENT INTEREST

The invention described herein may be manufactured and used by or for the Government of the United States of America for government purposes without the payment of any royalties therefor.

BACKGROUND OF THE INVENTION

This invention has a plurality of uses, for example and without limitation, including detection of rough handling during product shipping and detection of vehicle impact from accidents. In the field of package handling it is often desired to know if a package has been subject to mishandling. That is, if the package has exceeded a certain shock level, such as by dropping, it may be an indication that the package contents may have been damaged. This situation is of particular concern especially if the contents are comprised of delicate electronics or instrumentation or any specialized equipment.

Various types of sensors are used to determine if a shock level has been exceeded. Visual sensors, which may be attached to a package, include glass vials filled with dye that will rupture when the shock level is exceeded, thereby displaying the dye, and indicating, for example, that the package has been dropped during handling. Another visual arrangement includes a ball and spring whereby the ball will become displaced if the shock level is exceeded. Such visual sensors will reveal that the shock level has been exceeded but are unable to display the direction of the shock or, at best, only display the shock from a limited number of directions.

Electronic sensors include well-known accelerometers, which record acceleration movement for later display. Such electronic sensors however require a power supply in order to record accelerations as well as a power supply to subsequently read out the recorded values.

In addition to placement on a package it is often desired to place one or more sensors inside a particular piece of equipment to see if it has been subject to rough use. A need therefore exists to provide a miniature sensor, which may be placed on or in a container and does not require any sort of power for recording a shock event. It is an object of the present invention to provide such sensor.

SUMMARY OF THE INVENTION

A multi-directional shock sensor is provided which includes a central post with a toroidal mass surrounding the central post. A spring arrangement connects the mass with the central post to allow for omnidirectional movement of the mass and a plurality of anchor members surrounds the mass. A plurality of latching arm assemblies is provided where each latching arm assembly includes a first arm opposed to a second arm. Each of the first arms is connected to a respective one of the anchor members and each of the second arms is connected to the mass. Movement of the mass due to a shock event causes at least one of the second arms to engage and latch with an opposed one of the first arms, whereby the shock event and direction of the shock event may be determined. Accordingly, the multi-directional shock sensor can record in-plane shocks from any direction without an electric power source.

BRIEF DESCRIPTION OF THE DRAWINGS

The invention will be better understood, and further objects, features and advantages thereof will become more apparent from the following description of the preferred embodiment, taken in conjunction with the accompanying drawings, in which.

DETAILED DESCRIPTION OF THE PREFERRED EMBODIMENTS

Figure 1:
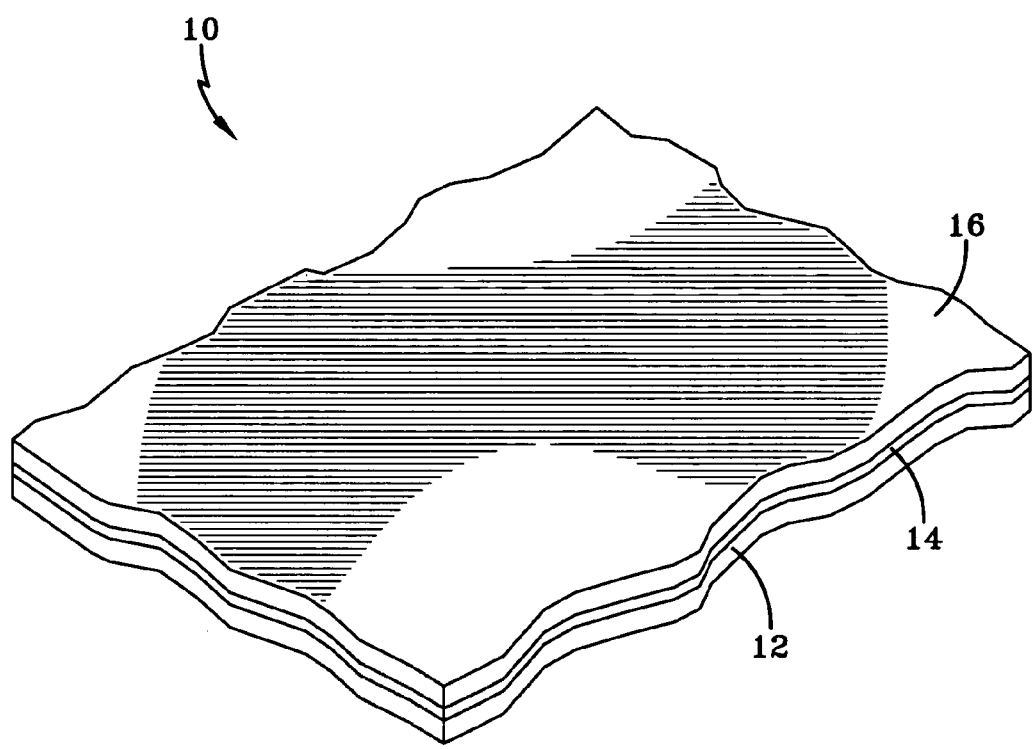
FIG. 1 is a view of an SOI wafer prior to fabrication of the sensor device.

In the drawings, which are not necessarily to scale, like or corresponding parts are denoted by like or corresponding reference numerals.

FIG. 1 illustrates a portion of an SOI (silicon on insulator) wafer 10 from which the sensor of the present invention will be fabricated. The structure of FIG. 1 includes a silicon substrate 12 (also known as a handle layer) covered by an insulating layer 14, such as silicon dioxide, over which is deposited another silicon layer 16 (also known as the device layer), which is the layer from which the sensor will be fabricated.

Figure 2:
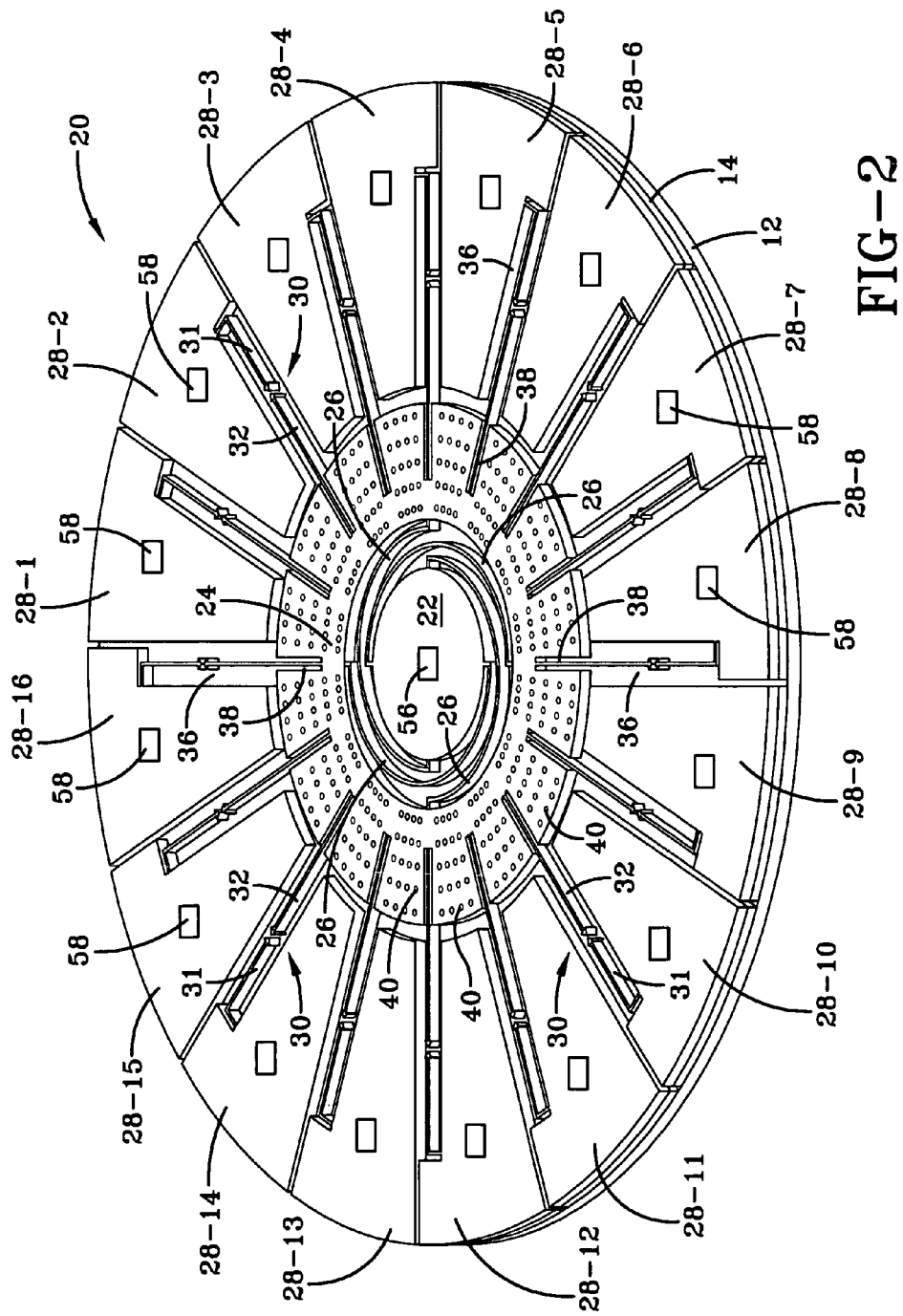
FIG. 2 is a view of the fabricated sensor device.

FIG. 2 is a view of a sensor 20 formed from the wafer 10 of FIG. 1. The sensor is formed by a DRIE (deep reactive ion etching) process, which removes unwanted portions of layer 16. The DRIE process is a well developed micromachining process used extensively with silicon based MEMS (micro electromechanical systems) devices. For this reason silicon is the preferred material for the sensor of the present invention, although other materials are possible.

Sensor 20 is one of a multitude of similar sensors fabricated on the same wafer 10, with all of the sensors being separated after fabrication for use as individual multi-directional shock sensors. Sensor 20, etched in the top silicon layer 16 includes a central post 22 surrounded by a toroidal mass 24 and connected to the post 22 by means of a series of springs 26. Completely surrounding the mass 24 is a plurality of individual wedge shaped anchor members, sixteen of which 28-1 to 28-16 are illustrated by way of example.

Sensor 20 includes a plurality of latching arm assemblies 30, each having a first arm 31 connected to a respective anchor 28-1 to 28-16, and a second arm 32 connected to the mass 24. Arms 31 and 32 are positioned in a notched-out portion 36 on the side of a respective anchor, and each arm 32 is positioned within a respective radial notch 38 formed in mass 24, so as to allow for greater flexibility of the first arm. Accordingly, the first arm 31 is opposed the second arm 32. In addition, the notched-out portion 36 may be a variety of shapes, including a substantially reversed "L" shape.

In order to operate as a multi-directional shock sensor, mass 24, as well as springs 26 and arms 31 and 32 must be free to move and therefore must be free of any underlying silicon dioxide insulating layer 14. One way to accomplish the removal of the underlying insulating layer is by applying an etchant such as hydrofluoric acid, which will dissolve the silicon dioxide.

The etchant will, in a relatively short period of time, dissolve the insulation beneath the arms 31 and 32 as well as under the springs 26, since they are of small width, thus freeing them for movement. In order to shorten the time for dissolving the silicon dioxide under mass 24, mass 24 is provided with a series of apertures 40 which extend from the top surface down to the insulating layer 14, thereby allowing the etchant direct access to the mass undersurface. Although some of the etchant dissolves the insulation under the post 22 and anchors 28-1 to 28-16, the process of freeing the mass 24, springs 26 and latching arm assemblies 30 is completed before the post and anchors are completely freed so that they remain immovable.

Figure 3A:
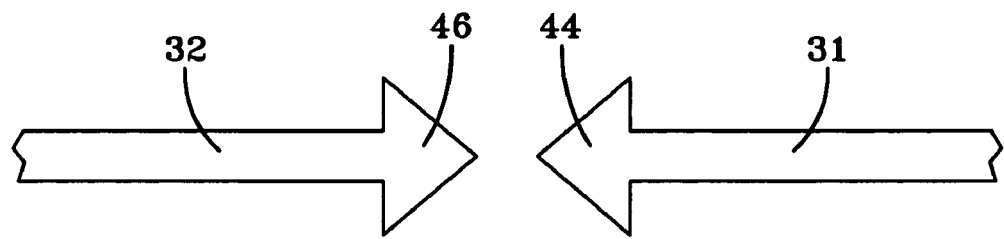
FIG. 3A illustrates the arms of a latching arm assembly in an unlatched condition.
Figure 3B:
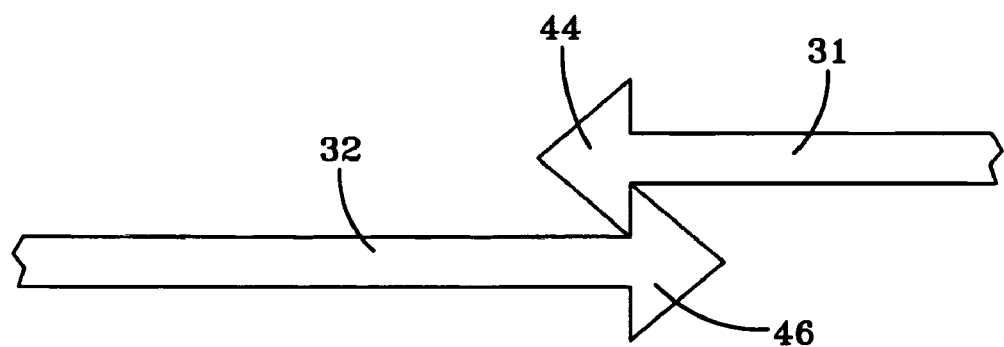
FIG. 3B illustrates the arms of a latching arm assembly in a latched condition.

If a shock in the plane of the device is of sufficient force and is of sufficient duration, mass 24 will move in the direction opposite to the applied shock, resulting in the latching of at least one or two of the latching arm assemblies 30. With additional reference to FIGS. 3A and 3B, FIG. 3A illustrates first and second arms 31 and 32 of a latching arm assembly prior to latching. Each of the arms includes a latching segment in the form of a respective arrow-head 44 and 46 at the ends thereof where the respective arrowhead 44 and 46 is in the shape of a triangle. As a result of the movement of mass 24 to which arm 32 is connected, the shock event will cause arm 32, more particularly arrow-head 46, to slide past arrow head 44 of arm 31. When the shock event ceases, arm 32, under the action of springs 26, will tend to revert to its normal position, however it will be prevented from doing so since the arrow heads 44 and 46 will lock in the position illustrated in FIG. 3B. In particular, the invention may be set and calibrated to a predetermined threshold in order to respond to a shock event of a particular magnitude. Once the shock event exceeds the particular magnitude, the arrowheads 44 and 46 will slide and lock. The stiffness of the springs 26, the size of the toroidal mass 24 and the configuration of the latching segment, for example and without limitation, the arrow heads 44 and 46, are each adjustable and may be varied when selecting the predetermined threshold. This invention is particular useful and will respond to a broad range of shock events where the shock level, that is, the force of acceleration of gravity (gs), for example and without limitation, may typically be in a range of about 5 gs to about 30,000 gs, and further may more particularly be in a range of about 50 gs to about 3,000 gs. Accordingly, the multi-directional shock sensor will record in-plane shocks from any direction without an electric power source.

Referring back to FIG. 2, the sensor 20 is provided with a plurality of contact pads for electrical connections. More particularly, central post 22 includes a contact pad 56 and each anchor 28-1 to 28-16 includes a respective contact pad 58. The occurrence of the shock, as well as its direction may then be detected by examining which arm assembly or assemblies 30 have latched, as in FIG. 3B. This may accomplished electrically and to this end reference is additionally made to FIG. 4. Although not illustrated, means may be provided for unlatching the arms after a latching situation.

Figure 4:
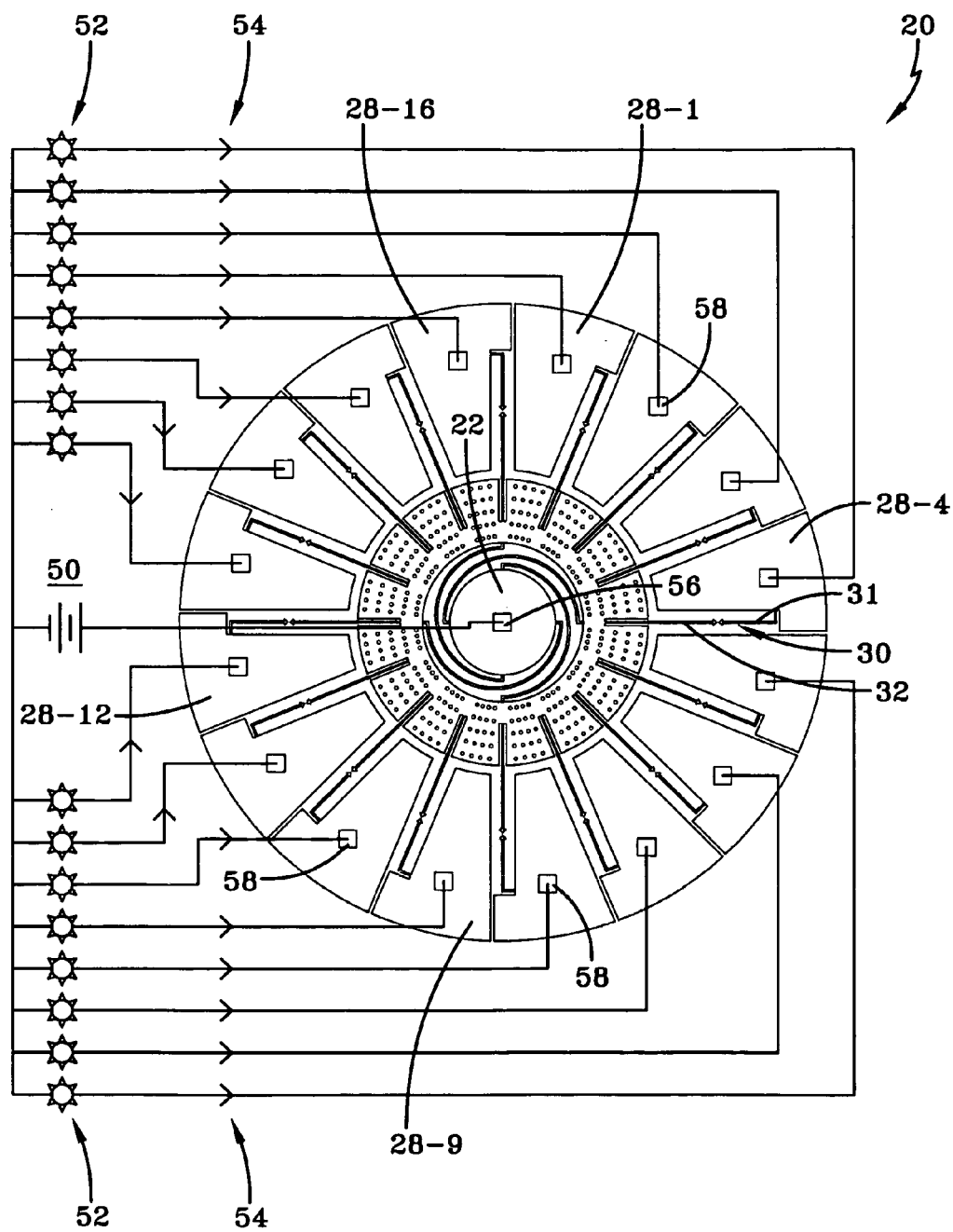
FIG. 4 is an electrical diagram for indicating excessive shock and shock direction.
Figure 5:
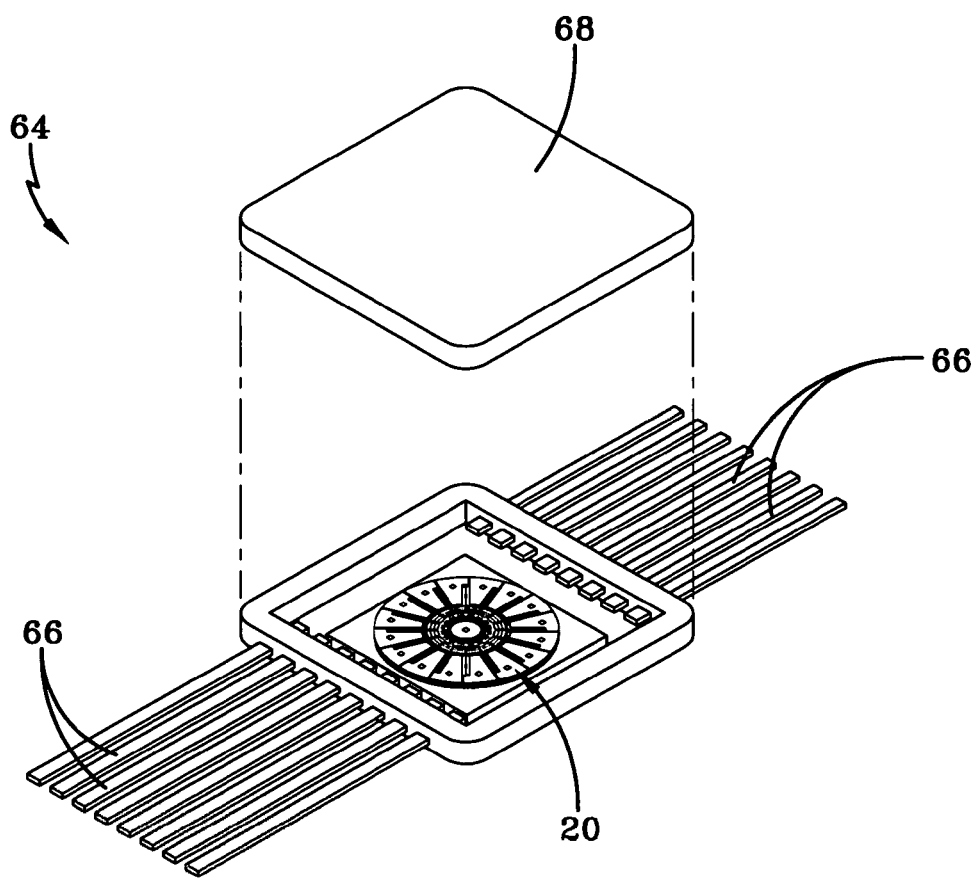
FIG. 5 illustrates one type of packaging arrangement for the sensor device.

For electrical detection of latching, the silicon from which the sensor is fabricated is sufficiently doped so as to make it electrically conducting. Arms 31 and 32 are, in essence, an open switch when unlatched and a closed switch when latched. There are many ways to determine if a switch is closed or not and FIG. 4 illustrates one such way. The sixteen latching arm assemblies 30, one for each anchor 28-1 to 28-16 are electrically in parallel, with each arm 32 being electrically connected to one side of a power source such as battery 50, via mass 24, springs 26 and contact pad 56. Each arm 31 is connected to an indicating element such as a light 52 via an anchor and contact pad 58, with each light 52, in turn, being connected to the other side of battery 50. The battery 50 and lights 52 may be part of a read out system which includes probes 54 for connection to the exposed leads of a sensor package, as in FIG. 5 or 6, to be described. If any latching arm assembly 30 latches, the light connected to that particular assembly will activate, thereby providing an indication of shock exceeding a certain level, as well as shock direction.

Once the sensors have been fabricated on a wafer, the wafer is diced to provide a plurality of sensors 20. In order to provide for mechanical coupling to sense shock, electrical connections to sense switch closure and protection from the environment, each sensor is then placed in a protective sensor package such as sensor package 64 illustrated in FIG. 5. Sensor package 64 is a conventional integrated circuit chip carrier having leads 66 for attachment to all of the contact pads 56 and 58 of the sensor 20. A lid 68 is seam welded to the carrier to provide for a hermetic seal.

Figure 6:
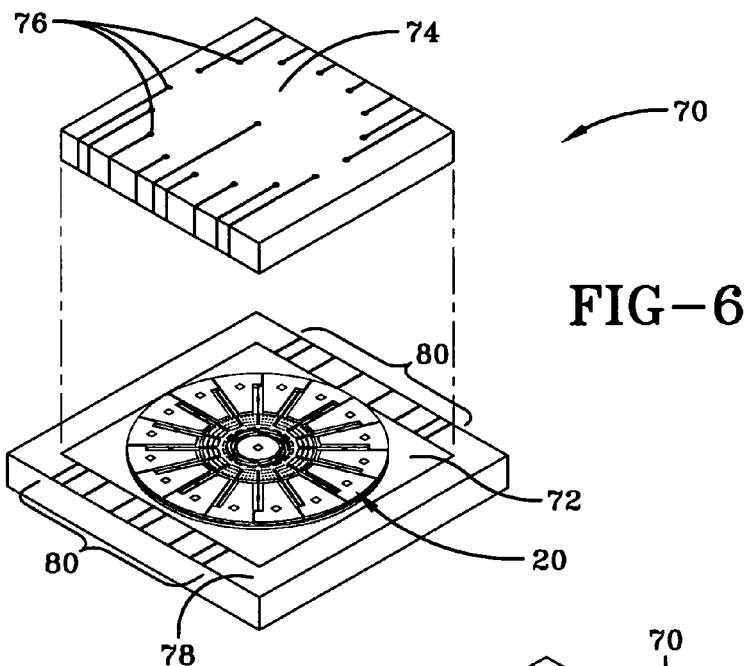
FIG. 6 illustrates another type of packaging arrangement for the sensor device.

Another packaging arrangement which is significantly less costly than a chip carrier is illustrated in FIG. 6. In this embodiment, the sensor 20 includes a surrounding border 72 to which a lid 74 may be hermetically sealed to form a hermetically sealed package.

Extending through the top of the lid 74 is a plurality of metalized vias 76 which make electrical contact with corresponding contact pads 56 and 58 of sensor 20. The arrangement is affixed to a printed circuit board 78 having leads 80 for electrical connection to the vias 76.

Figure 7:
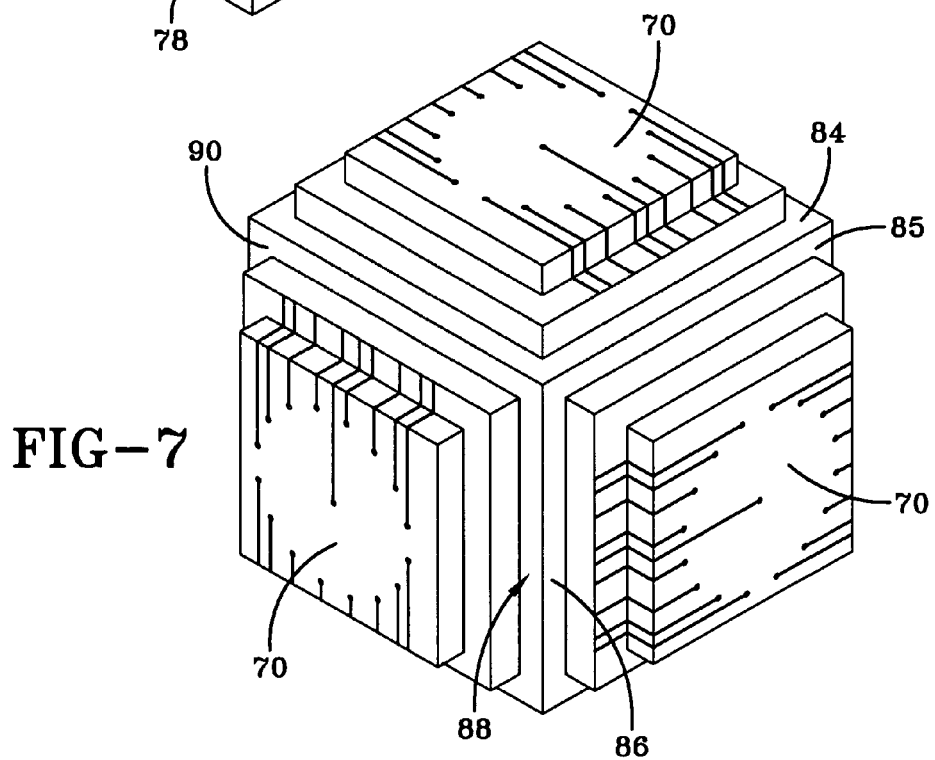
FIG. 7 illustrates an arrangement for detecting shock in an XYZ coordinate system.

The sensor 20 provides an indication of a shock event in the plane of the sensor. It may be desirable to be able to measure for shock in other directions and the arrangement of FIG. 7 provides for this capability. In FIG. 7, three sensor packages 70 of the type shown in FIG. 6 are mounted on three mutually perpendicular surfaces 84, 85 and 86 of a support 88. An unused surface 90 may then be affixed, such as by an adhesive, to a container which may be subjected to shock. In this manner, shock readings in an XYZ coordinate system may be obtained.

EXAMPLE 1

Shock Sensor Testing

Applicant's invention was tested with successful results. The shock sensor was tested to determine the threshold latching level. This series of tests was used to calibrate the sensor, in order to relate its performance to an actual shock event. Each shock test series was performed by successively shocking the sensor at higher values until it latched. The last two shock levels formed the bounds for the threshold of the shock sensor. The shock sensor was tested at various orientations to determine its ability to record shock from different directions.

The sensors to be tested were attached to an aluminum carrier with thermoplastic and covered with a plastic lid prior to testing on a shock table. The sensors were packaged in a class 10,000 clean room to reduce the risk of dust contamination. A mounting plate was used under the carrier in order to test it at various orientations. For these shock tests, two aluminum carriers were prepared. One carrier held one sensor, and the other carrier held two sensors. A linear shock table (from GHI Systems) was used to perform the shock testing. The aluminum test fixture containing the sensors was mounted to the magnesium block on the shock table. This block was then pulled back against the shock table springs and released. The block was then accelerated until it impacted the rubber stop (the programmer). This impact produced the shock on the sensor.

An accelerometer was mounted in the magnesium block to record the shock level. The shock level was adjusted by controlling the distance that the block traveled into the shock table springs before it was released. The shock pulse was measured using a data acquisition system, and it was filtered at 5 kHz. The maximum g-level of the shock pulse was recorded after filtering. The shape of the shock pulse was approximately haversine (resembling half of a sine wave), and the duration was 0.80 ms. Table 1 gives the details on the accelerometer and the data acquisition used to record the shocks.

TABLE 1

Accelerometer and data acquisition information.

| | Accelerometer | | Data Acquisition |
|---|---|---|---|
| Model | Dytran 3200 B6T | Software | Wincat |
| Range | ±2500 g | Sampling Rate | 1 MHz |
| Sensitivity | 1.92 mV/g | Filter | 5 kHz |

Since the sensors latch once the shock threshold is reached, the sensors were tested by successively ramping up the shock level until the sensors latched. The sensors were inspected with a boroscope after each shock to determine whether they latched. Once the latch took place, the last two shock levels were recorded as "not latched" and "latched." These two levels form the lower and upper bound for the actual shock threshold. After a successful test series, the sensors were manually reset using steel probes in the clean room. The sensors were then re-tested at a different orientation. They were tested at orientations ranging from 0° to 20° in 5° increments. Table 2 gives a summary of the test results.

TABLE 2

Shock testing summary.

| | Sensor Number | | | | | |
|---|---|---|---|---|---|---|
| | 34 | | 14A | | 14B | |
| Angle | Not Latched | Latched | Not Latched | Latched | Not Latched | Latched |
| 0 | 500 | 522 | 577 | 589 | 538 | 552 |
| 5 | 513 | 526 | 565 | 578 | 521 | 537 |
| 10 | 513 | 530 | 567 | 577 | 527 | 541 |
| 15 | 500 | 513 | 553 | 566 | 529 | 546 |
| 20 | NR | 496 | 542 | 555 | 530 | 542 |
| Average | 507 | 517 | 561 | 573 | 529 | 544 |
| SD | 7.5 | 13.5 | 13.5 | 12.9 | 6.1 | 5.7 |
| % SD | 1.5 | 2.6 | 2.4 | 2.3 | 1.2 | 1.0 |

If the tests for the different sensors and orientations are averaged, then the threshold latching level for the multi-directional shock sensor was 538 g. Overall, there appears to be no significant variation or trend between the latching values at different angles. The average standard deviation expressed as a percentage of the average latching value is 1.8%. The individual sensors showed very repeatable results in successive tests, with a maximum standard deviation of 2.6%. The test procedure demonstrates a valid method of test as the average error in the test recording across all the data is ±2.7%. This was computed by taking the percent average delta between "non-latching and "latching" values across all data points. There was a larger variation in latching levels between different sensors (about 10%) and the differences may be due to the sensors being fabricated at different times before packaging, which may increase the risk for contamination from dust and moisture and may have contributed to the higher latching level. Nonetheless, the test results validate the Applicant's invention.

The forgoing summary, description and example of the present invention are not intended to be limiting, but are only exemplary of the inventive features defined in the claims. Accordingly, all modifications, alterations and changes coming within the spirit and scope of the present invention are herein meant to be included.

Finally, the numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding techniques.

What is claimed is:

1. A multi-directional shock sensor, comprising:
   a central post;
   a toroidal mass surrounding said central post;
   a spring arrangement connecting said toroidal mass with said central post allowing for omnidirectional movement of said toroidal mass;
   a plurality of anchor members surrounding said toroidal mass; and
   a plurality of latching arm assemblies where each latching arm assembly includes a first arm being opposed to a second arm,
      wherein each said first arm is connected to a respective anchor member of said plurality of anchor members,
      wherein each said second arm is connected to said toroidal mass, and
      wherein movement of said toroidal mass due to a shock event causes at least one of said second arm to engage and latch with an opposed one of said first arm, whereby the shock event and direction of said shock event is determined.

2. The multi-directional shock sensor according to claim 1, wherein each said respective anchor member includes a notch portion, said first arm is positioned in said notch portion.

3. The multi-directional shock sensor according to claim 2, wherein said notch portion is situated along an edge of said respective anchor member.

4. The multi-directional shock sensor according to claim 2, wherein said notch portion is substantially a reversed "L" shaped notch portion.

5. A multi-directional shock sensor coordinate system for shock readings, comprising:
   a support structure, comprising:
      a plurality of contact surfaces and a shock surface; and
   a plurality of multi-directional shock sensor packages according to claim 2 being affixed to said plurality of contact surfaces, wherein said notch portion is substantially a reversed "L" shaped notch portion, wherein said plurality of contact surfaces comprise at least three mutually perpendicular surfaces, and wherein said shock surface is perpendicular to said plurality of contact surfaces where said shock surface is subjected to a shock event.

6. The multi-directional shock sensor according to claim 1, wherein said toroidal mass includes a plurality of radial notches where each said first arm occupies and extends from a respective radial notch of said plurality of radial notches in said toroidal mass.

7. The multi-directional shock sensor according to claim 1, wherein said multi-directional sensor is comprised of electrically conductive material.

8. The multi-directional shock sensor according to claim 7, wherein said electrically conductive material is silicon doped to make it electrically conducting.

9. The multi-directional shock sensor according to claim 1, further comprising a plurality of electric contact pads comprising one pad being positioned on said central post, and each remaining pad of said plurality of electric contact pads being positioned on said respective anchor member.

10. The multi-directional shock sensor according to claim 9, further comprising electric circuitry connecting to said plurality of electric contact pads for determining a status of whether at least one of said plurality of latching arm assemblies has latched after a shock event.

11. The multi-directional shock sensor according to claim 1, wherein said toroidal mass is initially formed on, and attached to, an insulating layer, and wherein said toroidal mass includes a plurality of apertures extending from a top surface of said toroidal mass down to said insulating layer and allow an etchant to pass through said plurality of apertures and dissolve said insulating layer beneath said toroidal mass.

12. The multi-directional shock sensor according to claim 1, wherein said first arm and said second arm each comprise a latching segment.

13. The multi-directional shock sensor according to claim 12, wherein said latching segment comprises an arrowhead shaped latching segment.

14. A multi-directional shock sensor package, comprising:

a hermetically sealed package; and a multi-directional shock sensor according to claim 1, wherein said multi-directional sensor is positioned within said hermetically sealed package, and wherein said hermetically sealed package comprises leads electrically connected to a plurality of electric contact pads of said multi-directional sensor.

15. A multi-directional shock sensor package, comprising:

a circuit board;

a multi-directional shock sensor according to claim 1 being surrounded by a border and being situated on said circuit board; and a lid being sealed to said border.

16. The multi-directional shock sensor according to claim 1, wherein said shock event is in a range of about 5 gs to about 30,000 gs.

17. The multi-directional shock sensor according to claim 1, wherein said shock event is in a range of about 50 gs to about 3,000 gs.

18. The multi-directional shock sensor according to claim 1, wherein said toroidal mass is a moveable toroidal mass for movement opposite to said shock event in a plane of said multi-directional shock sensor.

19. The multi-directional shock sensor according to claim 1, further comprising an insulating layer under said first arm arm and said second arm, wherein said first arm and said second arm are moveable independent of said insulating layer.

* * * * *